US012585411B2

(12) United States Patent
Tamari et al.

(10) Patent No.: US 12,585,411 B2
(45) Date of Patent: Mar. 24, 2026

(54) OPTICS-BASED DISTRIBUTED UNIFIED MEMORY SYSTEM

(71) Applicant: Apple Inc., Cupertino, CA (US)

(72) Inventors: Eran Tamari, Los Altos, CA (US);
Brian S. Leibowitz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/610,974

(22) Filed: Mar. 20, 2024

(65) Prior Publication Data

US 2025/0094093 A1 Mar. 20, 2025

Related U.S. Application Data

(60) Provisional application No. 63/584,170, filed on Sep. 20, 2023.

(51) Int. Cl.
*G06F 3/00* (2006.01)
*G06F 3/06* (2006.01)

(52) U.S. Cl.
CPC ............ *G06F 3/067* (2013.01); *G06F 3/0604* (2013.01); *G06F 3/0655* (2013.01)

(58) Field of Classification Search
CPC ....... G06F 3/067; G06F 3/0604; G06F 3/0655
See application file for complete search history.

(56) References Cited

U.S. PATENT DOCUMENTS

| | | | |
|---|---|---|---|
| 11,176,040 B2 | 11/2021 | Lee et al. | |
| 11,754,783 B2 | 9/2023 | Harris et al. | |
| 12,079,475 B1 * | 9/2024 | Mathuriya | G11C 11/4093 |
| 2006/0015697 A1 * | 1/2006 | Morishita | G06F 3/0659 |
| | | | 711/162 |
| 2009/0103855 A1 * | 4/2009 | Binkert | G02B 6/43 |
| | | | 257/E21.598 |
| 2016/0062696 A1 * | 3/2016 | Cerrelli | G06F 3/0638 |
| | | | 711/202 |
| 2018/0285252 A1 | 10/2018 | Kwon et al. | |
| 2018/0286360 A1 * | 10/2018 | Jahagirdar | G09G 5/022 |
| 2020/0132930 A1 | 4/2020 | Bchir | |
| 2020/0252459 A1 * | 8/2020 | Bhatia | G06F 9/542 |
| 2021/0118853 A1 | 4/2021 | Harris et al. | |

(Continued)

OTHER PUBLICATIONS

International Search Report and Written Opinion in PCT Appl. No. PCT/US2024/043412 mailed Dec. 4, 2024, 10 pages.

*Primary Examiner* — Craig S Goldschmidt
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to computing systems that use silicon photonics. In some embodiments, a computing system includes a plurality of compute die packages that include processors configured to execute program instructions that operate on data stored in a distributed memory accessible via a unified memory architecture. The computing system further includes a plurality of memory die packages configured to implement the unified memory architecture such that a given one of the memory die packages includes one or more optical interfaces configured to receive memory requests from the processors and one or more memory controllers configured to access a portion of the distributed memory in response to the received memory requests.

18 Claims, 12 Drawing Sheets

(56)     References Cited

U.S. PATENT DOCUMENTS

| | | | |
|---|---|---|---|
| 2022/0365583 A1 | 11/2022 | Vijayrao et al. | |
| 2022/0413216 A1* | 12/2022 | Hosseini | G02B 6/43 |
| 2023/0053530 A1 | 2/2023 | Hammarlund et al. | |
| 2023/0056044 A1 | 2/2023 | Hammarlund et al. | |
| 2023/0058989 A1 | 2/2023 | Hammarlund et al. | |
| 2024/0429184 A1* | 12/2024 | Lu | H01L 23/528 |

* cited by examiner

Memory Tray
200

Memory
Tray Port
210A

Memory
Die
Package
100A

Optics-Based
Shared Memory
System
700

Compute
Rack
600A

Memory
Rack
300

600B

*Multi-Core Fiber Array 800*

0.5mm

Fiber Array
900

19.2mm 2.4mm

*700*

OPTICS-BASED DISTRIBUTED UNIFIED MEMORY SYSTEM

The present application claims priority to U.S. Prov. Appl. No. 63/584,170, entitled "Optics-Based Distributed Memory System," filed Sep. 20, 2023, which is incorporated by reference herein in its entirety.

BACKGROUND

Technical Field

This disclosure relates generally to computing systems, and, more specifically, to computing systems that use silicon photonics.

Description of the Related Art

Modern mobile devices (e.g., smartphones) typically include a system on a chip (SoC) in which multiple elements (e.g., central processing units (CPUs), graphics processing units (GPUs), peripheral interfaces, memory, etc.) of a computing device are combined into a single chip. This type of architecture can offer multiple advantages over more traditional personal computer (PC) architectures in which elements reside on separate chips (or even separate cards) inserted into a motherboard. For example, an SoC can reduce the physical size of a device, which can be useful for applications that require portability. An SoC can improve the performance of a device by reducing the communication latency and power consumption between different components. An SoC can also lower the cost of a device by reducing the number of external components and simplifying the design and manufacturing process.

One of the benefits of an SoC architecture is the ability to implement a unified memory architecture in which multiple elements within an SoC can share a common memory pool. This can enable high bandwidth and low latency access between elements as, for example, a CPU wanting to pass data to a GPU can merely make the GPU aware of where the data is stored in the memory pool and allow the GPU to access the data directly. This approach can be far more efficient than moving data back and forth between system memory and a dedicated GPU memory, for example.

DETAILED DESCRIPTION

SoCs have primarily been used in small computing systems such as smartphones, tablets, wearables, and laptops. As larger computing systems such as server computing systems have power constraints and physical space constraints at a much larger scale, design of these systems have focused less on the use SoCs in favor of traditional architectures in which components are implemented separately. When SoCs are used in larger computing systems, however, the unified memory architecture implemented by a given SoC is confined to the elements within that SoC. Accordingly, a CPU within a first SoC may be able to pass data via the architecture to a first GPU within that SoC but cannot use the architecture to pass data to a second GPU in a second SoC as the second GPU does not have direct access to the internal memory pool of the first SoC. This limitation can severely reduce the benefit of using a unified memory architecture.

The present disclosure describes embodiments in which silicon photonics is used to scale a united memory architecture for larger computing systems such as server computing systems to create a distributed unified memory system. As will be described below in various embodiments, a computing system can include multiple compute die packages that include processors configured to execute program instructions that operate on data stored in a distributed memory accessible via a unified memory architecture. These processors can include any suitable types of processors such as one or more central processing units (CPUs), graphics processing units (GPUs), application-specific integrated circuit (ASICs), or field-programmable gate arrays (FPGAs). The computing system can also include multiple memory die packages configured to implement the unified memory architecture in which a given one of the memory die packages includes one or more optical interfaces configured to receive memory requests from the processors and one or more memory controllers configured to access a portion of the distributed memory in response to the received memory requests. A given one of the compute die packages can also include a compute die that includes one or more processors and an optical die coupled to the compute die via a die-to-die interconnect and including one or more optical interfaces.

Implementing a unified memory architecture in this manner can allow for greater resource utilization as processors in the compute die packages can share usage of the distributed memory implemented by the memory die packages. This architecture can also allow for easy scaling of the computing system, which, in some embodiments, can include multiple distributed nodes, each including racks of computing die packages and memory die packages.

Figure 1:
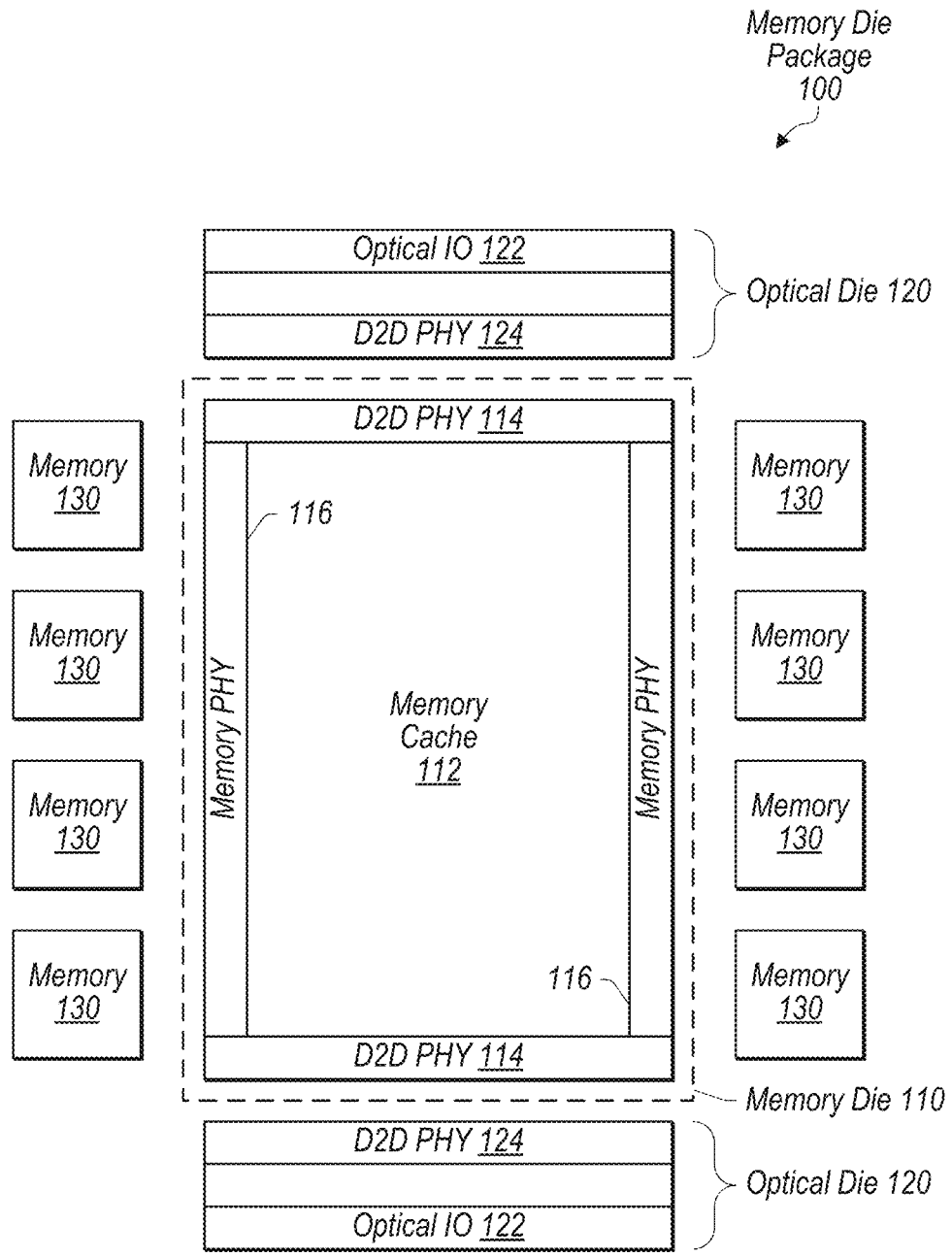
FIG. 1 is a block diagram illustrating an example of a memory die package in an optics-based distributed unified memory system.

Turning now to FIG. 1, a block diagram of a memory die package 100 at the heart of the computing system is depicted. In various embodiments, memory die package 100 includes one or more co-packaged dies includes an optical interface configured to receive, via one or more optical fibers, memory requests from one or more processors, a memory controller coupled to a memory and configured to service the memory requests, and a cache of the memory configured to store a portion of the data stored in the memory. In the illustrated embodiment, memory die package 100 includes a memory die 110 that includes a memory cache 112, die-to-die physical interfaces 114, and memory physical interfaces 116. Memory physical interfaces 116 are memory controller circuits coupled to one or more co-packaged memories 130. Memory cache 112 is a cache configured to store a subset of the data stored in memories 130. In the illustrated embodiment, memory die package 100 further includes multiple optical dies 120 coupled to memory controller die 110 via die-to-die physical interfaces 124 interconnects and including the one or more optical input/output interfaces 122 configured to communicate, via optical fibers, with other memory die packages 100 and compute die packages 400 discussed below with FIG. 4. In some embodiments, memory die packages 100 may be implemented differently than shown. In some embodiments, dies 110 and 120 (along with compute dies 420 discussed below with FIG. 4) are chiplets that work collectively to implement a system on a chip architecture.

In some embodiments, memory die package 100 can provide 64 LP5X channels, which provide up to 1088 GB/s of memory bandwidth (@8.5 GT/s) and up to 512 GB of memory capacity (16 Gb density, byte-mode, dual-rank). Memory cache 112 may include a 1 GB SRAM-based memory cache. In the illustrated embodiment, the Y-dimension of memory die 110 can determine the number of memory channels that can be supported, along with the cache capacity that fits within the die's area. The X-dimension of the optical die 120 can determine the amount of bandwidth that can be supported into and out of the memory die package 100. In some embodiments, the bandwidth supported is equal to 2.5 TB/s for each of the optical dies 120, thereby supporting up to 5 TB/s in total.

In some embodiments dies 110 and 120 may be chiplets connected via silicon interposer, silicon bridge or other similar high density interconnector technology referred to as 2.5D integration. In other embodiments, dies 110 and 120 may be vertically stacked and connected either face-to-face or face-to-back with through-silicon vias on one of the die, approaches referred to as 3D integration. In these 2.5D or 3D integration embodiments, D2D PHY 114 and D2D PHY 124 may communicate over a large number of signal paths, for example 8,000 signals operating at 4 GT/s to provide 20 Tb/s (2.5 TB/s) of interconnect bandwidth.

In some embodiments, optical die 120 may be a monolithic die integrating silicon photonic components such as silicon waveguides, micro-ring resonators, Mach-Zehnder modulators, and photodetectors as well as active electronic components for D2D PHY 124 and electrical portion of optical IO 122 such as modulator drivers, transimpedance amplifiers, and serialization/deserialization (SerDes) circuits. In some embodiments, optical die 120 may consist of a stack of two component dies, one containing the electronic components and one containing the photonic components, which are fabricated in different semiconductor manufacturing processes. In some embodiments, an external laser may provide continuous wave optical input to optical dies 120 through fiber-optic cables.

In some embodiments, optical die 120 may consist of a electrical die onto which an array of directly modulated light sources such as vertical-cavity surface emitting lasers (VC- SELs) or light-emitting diodes (LEDs) and photodetectors such as PIN photodiodes are assembled.

In some embodiments, optical fibers are connected to memory die package 100 via fiber-attach-units (FAUs) that couple light from optical fibers into the photonic components of optical dies 120. In some embodiments, FAUs may be edge-coupled to optically couple fiber waveguides to silicon waveguides on optical dies 120 in a co-planar orientation. In some embodiments, FAUs may be vertically-coupled to optically connect fiber waveguides to devices on the faces of optical dies 120, such as photodiodes, VCSELs, LEDs, or to couple light into silicon waveguides of optical dies 120 through vertical grating couplers (VGCs).

Memories 130 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. The devices may be mounted with an integrated circuit in a chip-on-chip configuration, a package-on-package configuration, or a multi-chip module configuration. Memories 130 may also be any type of non-volatile memory such as NAND flash memory, NOR flash memory, nano RAM (NRAM), mag-neto-resistive RAM (MRAM), phase change RAM (PRAM), Racetrack memory, Memristor memory, etc.

Figure 4:
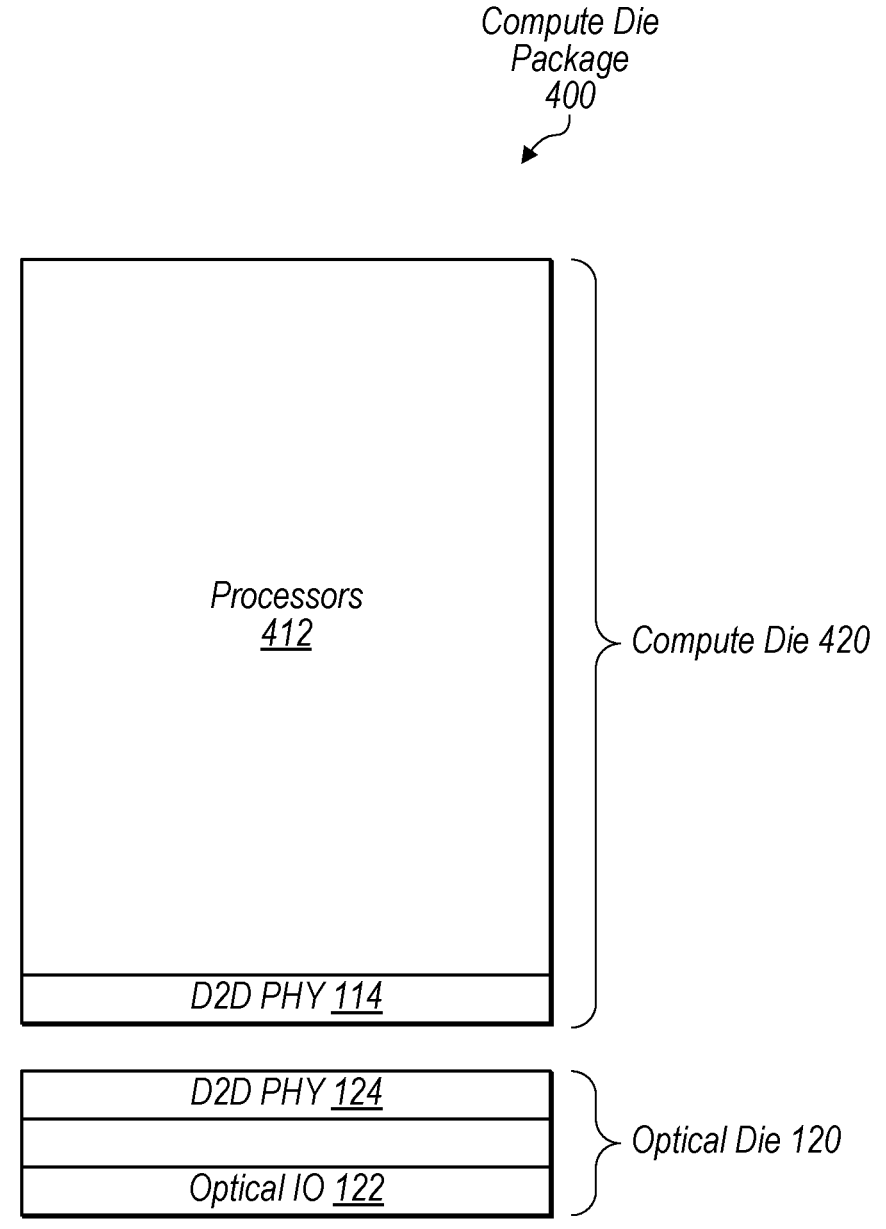
FIG. 4 is a block diagram illustrating an example of compute die package in the optics-based distributed unified memory system.

In various embodiments, memory die packages 100 are configured to implement a unified memory architecture (UMA) in which a distributed memory is implemented across memories 130 (including memories 130 in other memory die packages 100) and is shared by multiple processors such as those in compute die packages 400 discussed with FIG. 4. In some embodiments, the UMA is implemented such that a given one of the processors is configured to access any memory address within a unified address space defined by the unified memory architecture. In some embodiments, this unified address space is a virtual address space distinct from a physical address space provided by memories 130. In some embodiments, memory die packages 100 are further configured to implement the UMA in a manner such that memory accesses across memory die packages 100 appear transparent to software executing on compute die packages 400. In some embodiments, the UMA is implemented such that a given page within the unified address space is distributed among multiple ones of memory die packages 100. In some embodiments, memory die packages 100 are configured to perform address hashing to ensure even distribution of data across memories 130 in the UMA. In some embodiments, to enable different characteristics for accessing memories 130, optical interfaces 122 in memory die packages 100 and compute die packages 400 are configured to implement an optical interconnect fabric that includes at least two networks having heterogeneous operational characteristics. In some embodiments, one or more of the characteristics include a shorter route for the first network for memory requests than a route of the second network, characteristics to increase bandwidth of the first network compared to the second network, and/or allocating a larger number of optical fibers for the first network compared the second network, etc. In some embodiments, the first and second networks have heterogeneous interconnect topologies such as star topology, a mesh topology, a ring topology, a tree topology, a fat tree topology, a hypercube topology, or a combination of one or of the topologies. In some embodiments, the at least two networks include a coherent network interconnecting CPUs in the compute die packages 400 and memory dies 110 and a relaxed-ordered network interconnecting GPUs in the compute die packages 400 and memory dies 110. In some embodiments, a given one of memory die package 100 is coupled to the first and second networks and configured to receive memory requests from both of the first and second networks.

Figure 2:
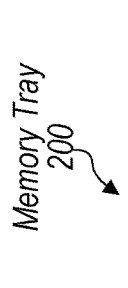
FIG. 2 is a block diagram illustrating an example of a memory tray including multiple memory die packages shown in FIG. 1.

Turning now to FIG. 2, a block diagram of a memory tray 200 is depicted. As shown, a memory tray 200 includes one or more memory dies packages 100. In some embodiments, memory addresses are uniformly hashed across the memory die packages 100 in the memory tray 200. The total available memory bandwidth and memory capacity provided by a memory tray 200 is dependent on the number of memory die packages 100 in the memory tray 200. For simplicity, memory tray 200 may include a power-of-two number of die packages 100. In the illustrated embodiment, a memory tray 200 includes 8 memory die packages 100, each memory die package 100 being mapped to ⅛ of the memory address space. This can amount to 512 LP5X channels, which provide up to 8.704 TB/s of memory bandwidth (@8.5 GT/s) and up to 4 TB of memory capacity (16 Gb density, byte-mode, dual-rank). This can also amount to tray 200 including an 8 GB SRAM-based memory cache. For completeness, as each Memory Die, in some embodiments, supports up to 5 TB/s of optical bandwidth, memory tray 200 can support up to 40 TB/s of optical bandwidth. In some embodiments, tray 200 may be implemented differently than shown.

For convenience, one side of the memory tray 200 may be referred to as the north side and the other side as the south side. Each memory tray 200 has a number of ports 210 that can be equal to twice the number of memory die packages 100 inside of it. Half of these ports 210 are located on the north side of the memory tray 200 while the other half are located on the south side of the memory tray 200. Within a given memory tray 200, ports 210 can be numbered from left to right starting with 1, and either N or S following to indicate the side of the tray. A given memory tray 200 can also have an ID associated with it as shown by the letter in the bottom left part of the figure (in this case this is memory tray A). With that, the ports in this example are identified as A1N . . . A8N, A1S . . . A8S.

To facilitate connectivity between every memory die package 100 to every memory tray port 210, in some embodiments, each memory die package 100 is connected via optical cables to all of the ports in the memory tray 200. In some embodiments, this optical interconnect fabric is configured to allow interconnection of a variable number of processor cores, graphics processing units, peripheral devices, or memory controller circuits.

In some embodiments, optical ports 210 may terminate to optical connectors such as MTP connectors to allow optical fiber ribbon cables or multi-core fibers to connect externally to memory tray 200.

Figure 3:
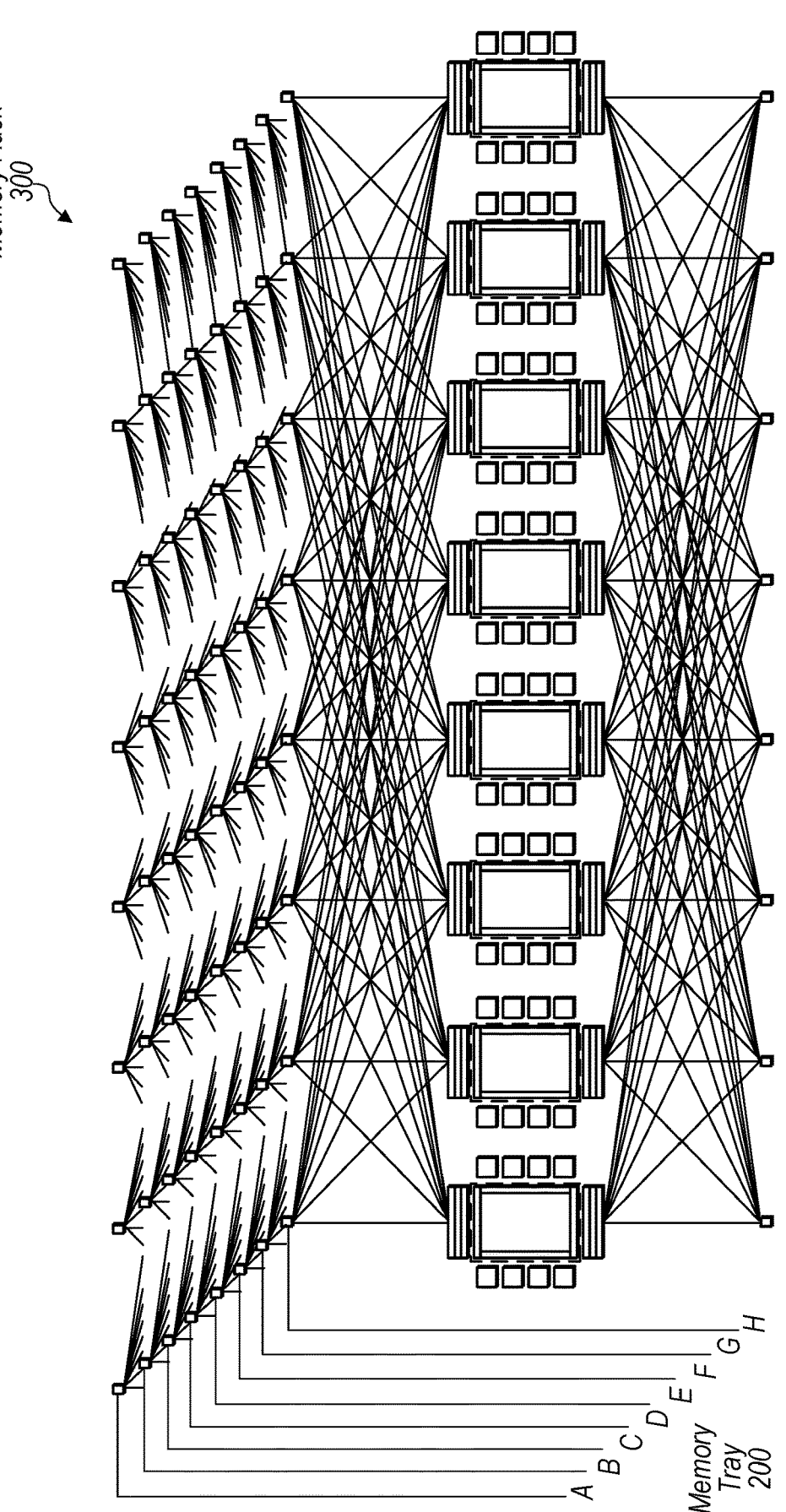
FIG. 3 is a block diagram illustrating an example of a memory rack including multiple memory trays in FIG. 2.

Turning now to FIG. 3, a block diagram of a memory rack 300 is depicted. As shown, a memory rack 300 includes one or more compute trays 200 inserted next to each other. In some embodiments, memory addresses are uniformly hashed across the memory die packages 100 in the memory rack 300. The total available memory bandwidth and memory capacity provided by a memory rack 300 is dependent on the number of memory die packages 100 in the memory rack 300. For simplicity, memory rack 300 may include a power-of-two number of memory trays 200, and that each memory tray 200 may include a power-of-two number of memory die packages 100. In the illustrated embodiment, a memory rack 300 includes 8 memory trays 200, where each memory tray 200 includes 8 memory die packages 100. In this case, each memory die package 100 is mapped to ¹⁄₆₄ of the memory address space. This can amount to rack 300 having 4096 LP5X channels, which provide up to 69.632 TB/s of memory bandwidth (@8.5 GT/s) and up to 32 TB of memory capacity (16 Gb density, byte-mode, dual-rank). This can also amount to rack 300 including a 64 GB SRAM-based memory cache. For completeness, as each memory die package 100, in some embodiments, supports up to 5 TB/s of optical bandwidth, rack 300 can support up to 320 TB/s of optical bandwidth. In some embodiments, rack 300 may be implemented differently than shown.

Within a given memory rack 300, trays 200 are identified from bottom to top starting with A. In order to uniquely identify a given port in the memory rack 300, the port's numbering can have the form of {Memory Tray ID} followed by {Tray Port Number} and either N or S to designate the side. For example, port C4N refers to port 4 (north side) on Tray C.

In the illustrated embodiment, the memory rack has 128 ports in total, 64 ports on each side. The ports in this example are identified as A1N . . . A8N, A1S . . . , A8S . . . H1N . . . H8N, H1S . . . H8S.

Turning now to FIG. 4, a block diagram of a compute die package 400 is depicted. As shown, compute die package 400 include one or more compute dies 420 co-packaged with one or more optical dies 120 coupled via a die-to-die interconnect created by physical interfaces 114 and 124. Compute die 420 can be customized for any suitable use-case and may include any suitable processors 412. For example, a compute die 420 can include one or more CPUs, GPUs, neural engines, ASICs, FPGAs, a mix of IPs, etc. In some embodiments, a compute die package 40 includes an 18-core CPU and a 40-FSTP GPU. The X-dimension of the optical die 120 can determine the amount of bandwidth that can be supported into and out of the compute die package 400. In some embodiments, the bandwidth supported is equal to 2.5 TB/s for the optical die 120. In some embodiments, compute die package 400 may be implemented differently than shown.

Figure 5:
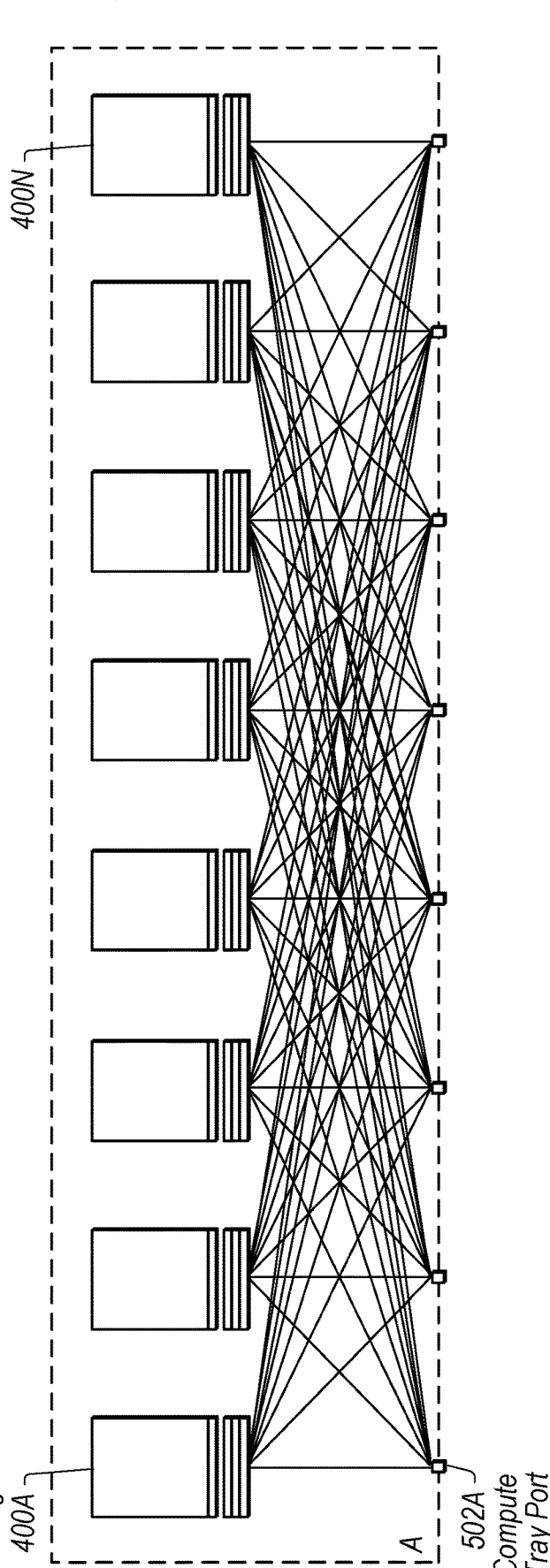
FIG. 5 is a block diagram illustrating an example of a compute tray including multiple compute die packages shown in FIG. 4.

Turning now to FIG. 5, a block diagram of a compute tray 500 is depicted. As shown, a compute tray 500 includes one or more compute die packages 400. The total available compute capability provided by a compute tray 500 is dependent on the number of compute die packages 400 in the compute tray 500. For simplicity, a compute tray 500 may include a power-of-two number of compute die packages 400. Note also that the compute die packages 400 in a compute tray 500 do not need to be identical—e.g., the choice of each compute die package 400 can be left to the system operator. In the illustrated embodiment, a compute tray includes 8 identical compute die packages 400, each of which may include an 18-core CPU and a 40-FSTP GPU. This can amount to a 144-core CPU and a 320-FSTP GPU. For completeness, as each compute die package 400 may support up to 2.5 TB/s of optical bandwidth, a compute tray 500 can support up to 20 TB/s of optical bandwidth. In some embodiments, tray 500 may be implemented differently than shown.

Each compute tray 500 has a number of ports 502 that can be equal to the number of compute die packages 400 inside of it. Within a given compute tray 500, ports 502 can be numbered from left to right starting with 1. A given compute tray may also have an ID associated with it as shown by the letter in the bottom left part of the figure (in this case this is compute tray A). With that, the ports 502 in this example are identified as A1 . . . A8.

To facilitate connectivity between every compute die package 400 to every compute tray 500 port, in some embodiments, each compute die package 400 is connected via optical cables to all of the ports in the compute tray 500.

Figure 6:
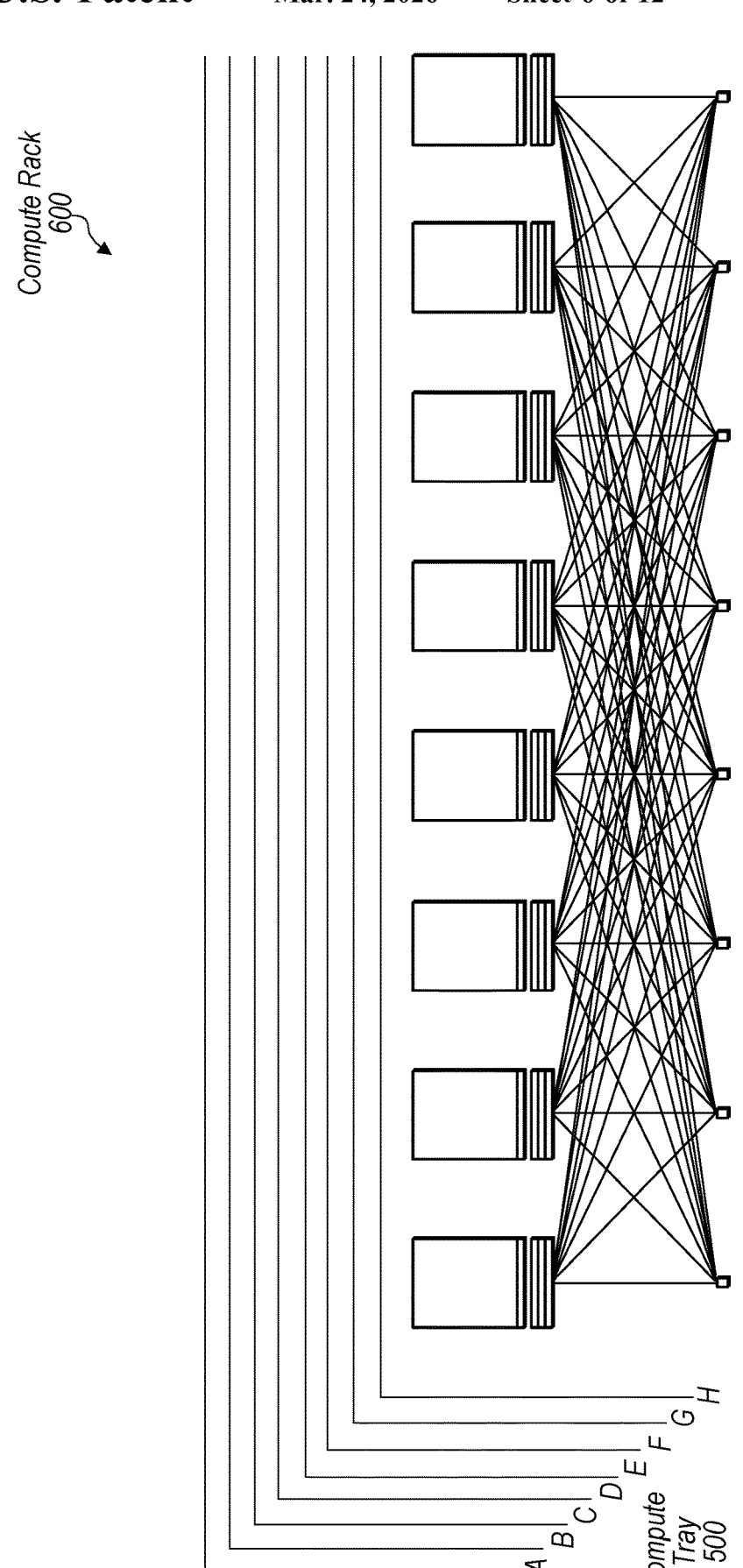
FIG. 6 is a block diagram illustrating an example of a compute rack including multiple compute trays in FIG. 5.

Turning now to FIG. 6, a block diagram of a compute rack 600 is depicted. As shown, compute rack 600 includes one or more compute trays 500 inserted next to each other. The total available compute capability provided by a compute rack 600 is dependent on the number and type of compute die packages 400 in the compute rack 600. For simplicity, a compute rack 600 may include a power-of-two number of compute trays 500, and that each compute tray 500 may include of a power-of-two number of compute die packages 400. Note also that compute die packages 400 in a compute rack 600 do not need to be identical—e.g., the choice of each compute die package 440 can be left to the system operator. In the illustrated embodiment, a compute rack 600 includes 8 compute trays 500, which include 8 compute die packages 400, each of which may include an 18-core CPU and a 40-FSTP GPU. This amounts to a 1152-core CPU and a 2560-FSTP GPU. For completeness, as each compute die package 400 may support up to 2.5 TB/s of optical band-width, this compute rack 600 may support up to 160 TB/s of optical bandwidth. In some embodiments, rack 600 may be implemented differently than shown.

Within a given compute rack 600, trays are identified from bottom to top starting with A. In order to uniquely identify a given port in the compute rack 600, the port's numbering can be expressed in the form of {compute tray ID} followed by {tray port number}. For example, port C4 refers to port 4 on Tray C.

In the illustrated embodiment, compute rack 600 has 64 ports in total. The ports in this example are identified as A1 . . . A8, . . . , H1 . . . H8.

Figure 7:
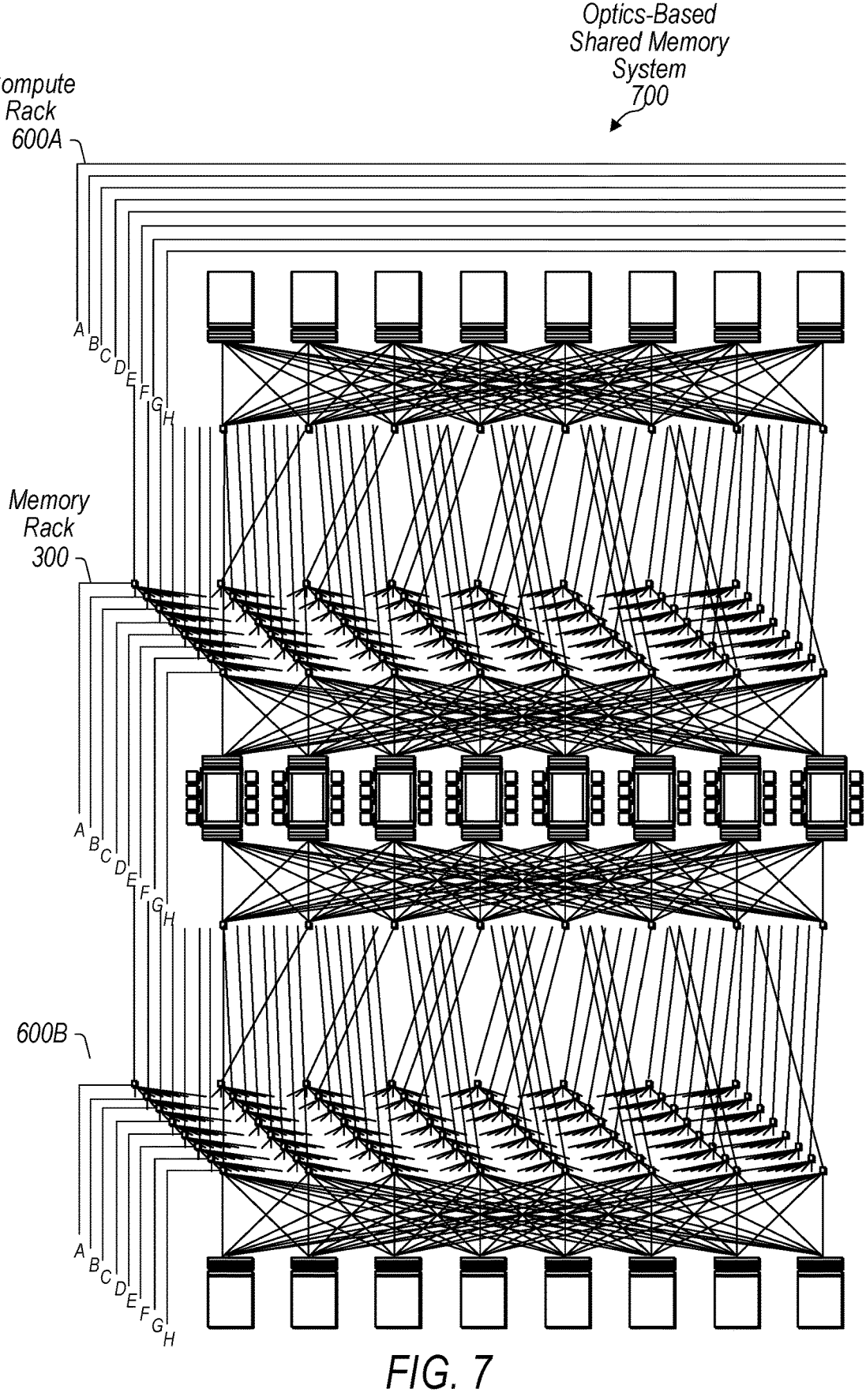
FIG. 7 is a block diagram illustrating an example of the optics-based distributed unified memory system including the memory rack in FIG. 3 and the compute rack FIG. 5.

Turning now to FIG. 7, a block diagram of optics-based distributed memory system/node 700 is depicted. In the illustrated embodiment, node 700 includes a single memory rack 300 and multiple compute racks 600A and 600B, each placed on either side of the memory rack 300. In the example described so far (8 die packages per tray and 8 trays per rack), each compute rack 600 can have 64 ports; each memory rack 300 can have 128 ports in which 64 ports may face south and 64 ports may face north. To facilitate con-nectivity between every compute tray 500 to every memory tray 200, each port in a given compute tray 500 can be connected via an optical cable to a different memory tray 200. For simplicity, it is assumed that a given port number on a compute tray 500 is connected to the same port number on the memory tray 200. In other words, a compute port X4 can connect to memory port Y4 (N or S, depending on the side it resides on) where X and Y are tray IDs. Furthermore, it is assumed for simplicity that port 1 on a given compute tray 500 can connect to port 1 on the equivalent memory tray 200, and that subsequent ports on the compute tray 500 can connect to subsequent memory trays 200.

In some embodiments, node 700 includes 4096 LP5X channels, which can provide up to 69,632 TB/s of memory bandwidth (at 8.5 GT/s) and up to 32 TB of memory capacity (16 Gb density, byte-mode, dual-rank). In some embodiments, node 700 also includes a 64 GB SRAM-based memory cache. Assuming each compute die package 400 includes an 18-core CPU and a 40-FSTP GPU, node 700 can include 128 compute die packages 400 with a total of 2304

CPU cores and a 5120-FSTP GPU. For completeness, as each memory die package 100 may support up to 5 TB/s of optical bandwidth, node 700 may support up to 320 TB/s of optical bandwidth.

Also note that each compute die package 400 can observe the same latency and bandwidth characteristics to main memory. In doing so, node 700, in essence, is the largest UMA machine ever to have been designed.

In some embodiments, system/nodes 700 may be imple-mented differently than shown such as including more or fewer racks 300 and/or 600. In some embodiments, multiple compute nodes 700 can also be interconnected as will be discussed with FIG. 10.

Figure 8:
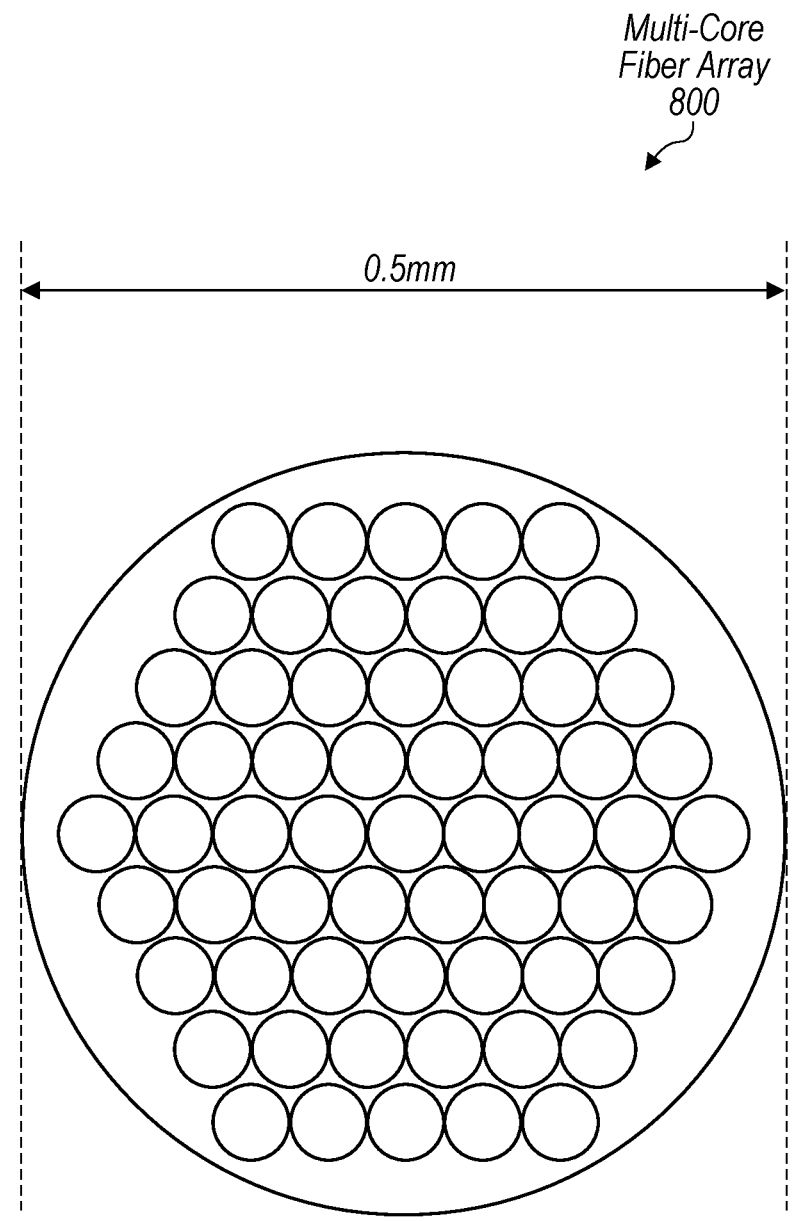
FIGS. 8 and 9 is block diagram illustrating examples of fiber arrays used by the optics-based distributed unified memory system.

Turning now to FIG. 8, a block diagram of a multi-core fiber array 800 is depicted. In the example shown, each optical die 120 can support a bandwidth of 2.5 TB/s. To support an 8×8×8 node configuration, each compute die package 400 (or memory die package 100) communicates (end-to-end) with 64 separate memory die packages 100 (or compute die packages 400). This may use 128 optical fibers (2 fibers per connectivity to support both directions) where each fiber may support up to 20 GB/s. One way to achieve this is to use a multi-core fiber array 800 as shown in FIG. 8. In the illustrated embodiment, this is a 61-core fiber array, where each core can be 0.05 mm in diameter and supporting switching speed of 4 Gbps. 40-cores may be used to trans-mit/receive data, and the rest of the 21-cores may be used for any auxiliary functionality outside of this specification. The electrical-to-optical (E/O) and optical-to-electrical (O/E) conversions are implemented at the optical dies 120 using either a modulator or a photodetector. In some embodiments, fiber array 800 may be implemented differently than shown. For example, a smaller number of cores can be accommo-dated if faster speeds are made possible.

Figure 9:
Figure 9:
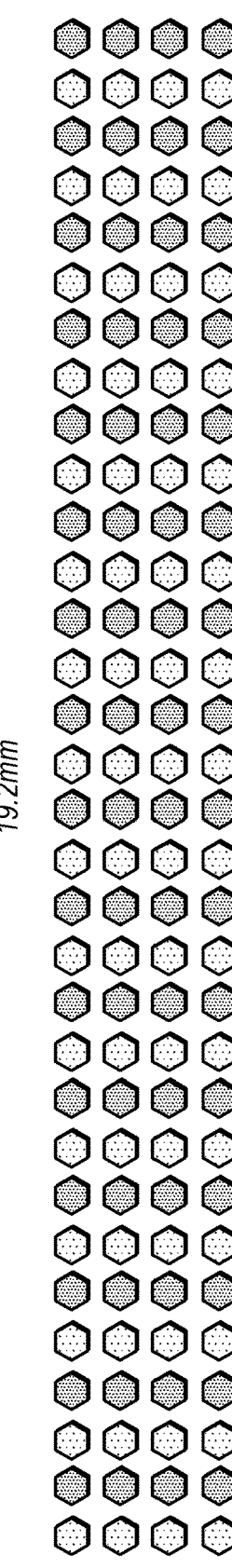

Turning now to FIG. 9, a block diagram of a fiber array 900 is depicted. In the illustrated embodiment, fiber array 900 is a 128-fiber array. Assuming a minimal distance for data routing to/from the transceivers, the total beachfront can be approximately 19.2 mm. In FIG. 9, light gray designates Tx (transmit) and dark gray designates Rx (re-ceive). In total, this 128-fiber array may support 2.5 TB/s of data transfer assuming the core capabilities mentioned above. In some embodiments, fiber array 900 may be implemented differently than shown.

Figure 10:
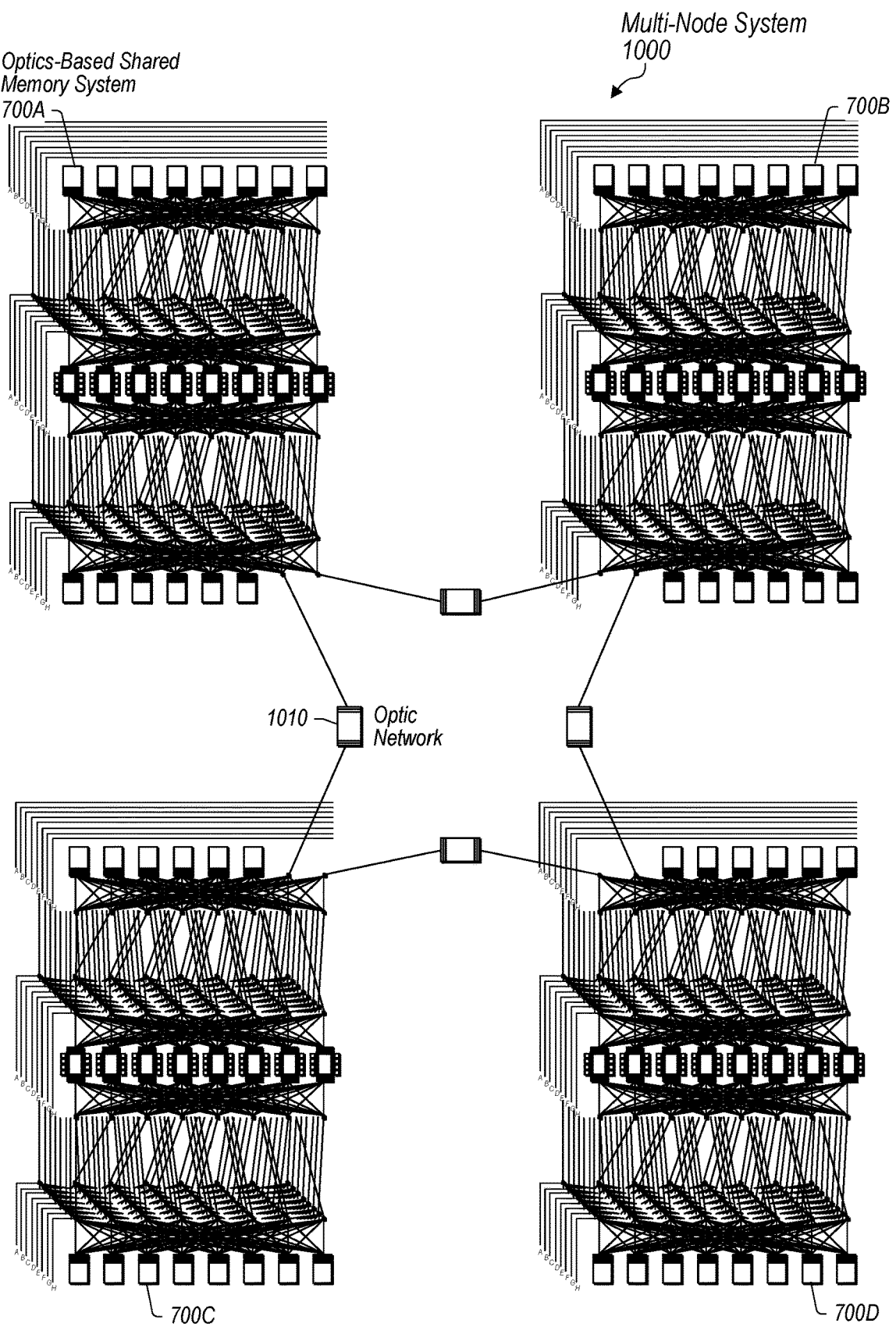
FIG. 10 is a block diagram illustrating an example of a multi-node system including multiple optics-based distributed unified memory systems.

Turning now to FIG. 10, a block diagram of a multi-node system 1000 is depicted. In some embodiments, it may still be beneficial to connect multiple nodes 700 together, each with its own shared memory. One option is to use a networking interface for this. An alternative is to replace any number of compute die packages 400 with a network direct memory access (DMA) die package that interfaces directly to the node 700's memory rack 300. This can provide for very high bandwidth between multiple nodes 700 but may be at the expense of reduced compute. An example of connecting four nodes together is shown in FIG. 10, where each node can have 126 compute die packages 400. In some embodiments, system 1000 may be implemented differently than shown.

Figure 11:
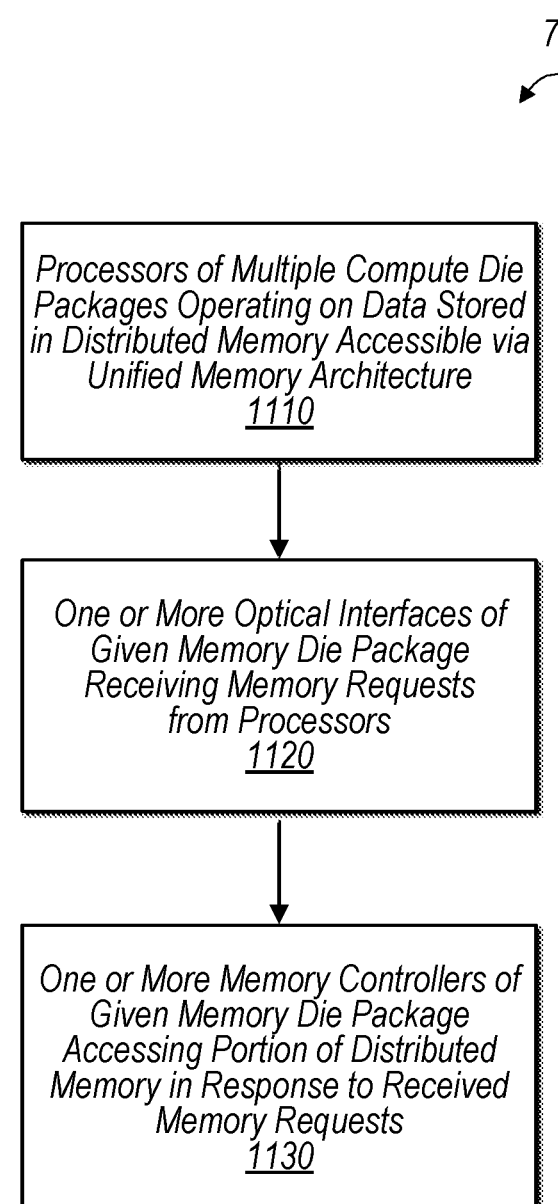
FIG. 11 is a flow diagram illustrating an example of a method implementing functionality described herein.

Turning now to FIG. 11, a flow diagram of a method 1100 is depicted. Method 1100 is one embodiment of a method performed by a computing system such as optics-based distributed memory system 700.

Method 1100 begins in step 1110 with processors (e.g., processors 412) included in a plurality of compute die packages (e.g., compute die packages 400) executing pro-gram instructions that operate on data stored in a distributed memory (e.g., memories 130) accessible via a unified memory architecture. In step 1120, one or more optical interfaces (e.g., optical IOs 122) in a given one of a plurality of memory die packages (e.g., memory die packages 100) configured to implement the unified memory architecture receive memory requests from the processors. In step 1130, one or more memory controllers (e.g., memory physical interfaces 116) access a portion of the distributed memory in response to the received memory requests.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a computing system configured to generate a simulation model of the hardware circuit, by a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 12:
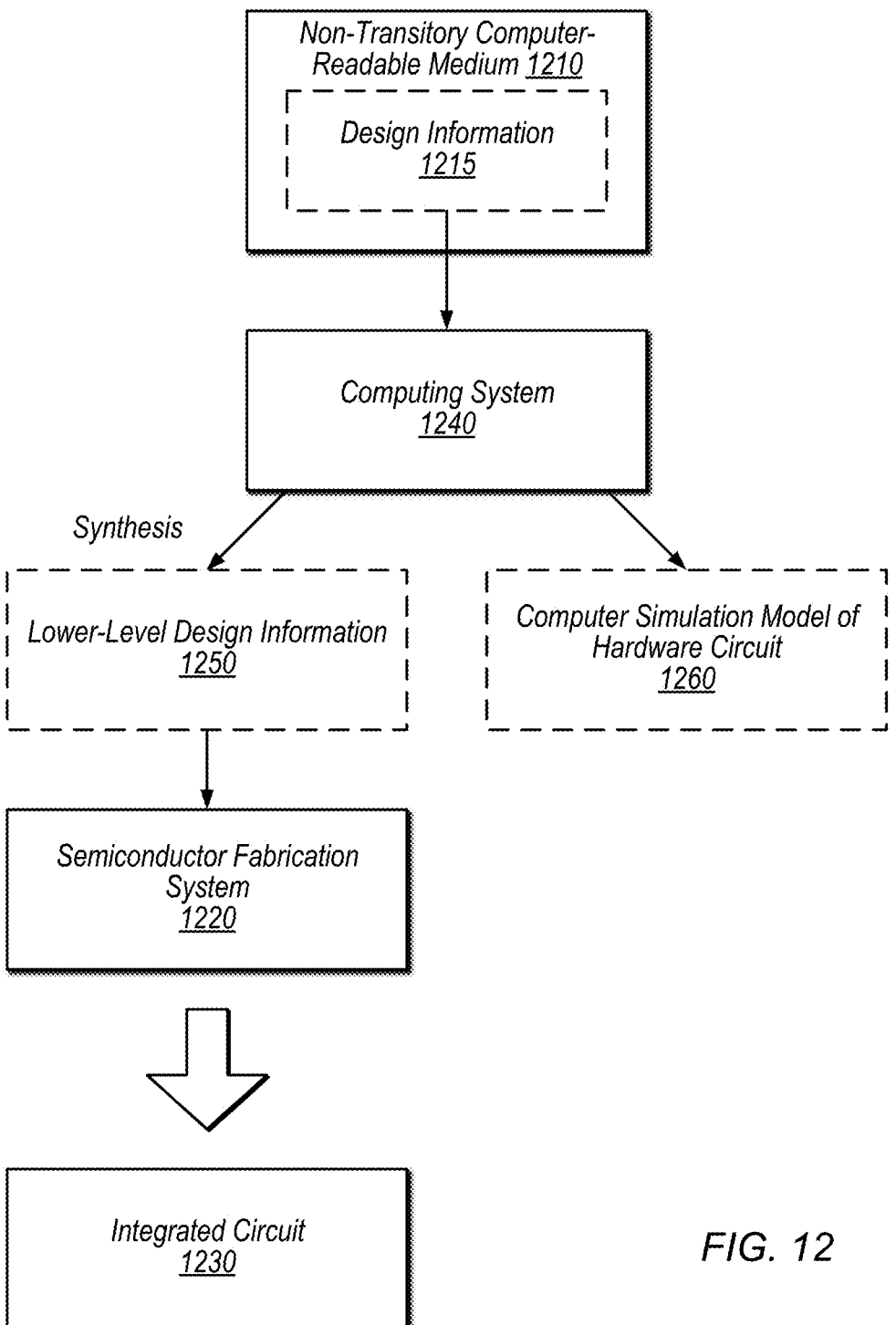
FIG. 12 is a block diagram illustrating an example computer-readable medium that stores circuit design information for implementing devices having functionality described herein.

Turning now to FIG. 12, a block diagram of an example non-transitory computer-readable storage medium that stores circuit design information is depicted. In the illustrated embodiment, computing system 1240 is configured to process the design information. This may include executing instructions included in the design information, interpreting instructions included in the design information, compiling, transforming, or otherwise updating the design information, etc. Therefore, the design information controls computing system 1240 (e.g., by programming computing system 1240) to perform various operations discussed below, in some embodiments.

In the illustrated example, computing system 1240 processes the design information to generate both a computer simulation model of a hardware circuit 1260 and lower-level design information 1250. In other embodiments, computing system 1240 may generate only one of these outputs, may generate other outputs based on the design information, or both. Regarding the computing simulation, computing system 1240 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1240 also processes the design information to generate lower-level design information 1250 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1250 (potentially among other inputs), semiconductor fabrication system 1220 is configured to fabricate an integrated circuit 1230 (which may correspond to functionality of the simulation model 1260). Note that computing system 1240 may generate different simulation models based on design information at various levels of description, including information 1250, 1215, and so on. The data representing design information 1250 and model 1260 may be stored on medium 1210 or on one or more other media.

In some embodiments, the lower-level design information 1250 controls (e.g., programs) the semiconductor fabrication system 1220 to fabricate the integrated circuit 1230. Thus, when processed by the fabrication system, the design information may program the fabrication system to fabricate a circuit that includes various circuitry disclosed herein.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Accordingly, non-transitory computer-readable storage medium 1210 may include two or more memory media; such media may reside in different locations—for example, in different computer systems that are connected over a network.

Design information 1215 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1240, semiconductor fabrication system 1220, or both. In some embodiments, design information may also include one or more cell libraries that specify the synthesis, layout, or both of integrated circuit 1230. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1230 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 and model 1260 are configured to operate according to a circuit design specified by design information 1215, which may include performing any of the functionality described herein. For example, integrated circuit 1230 may include any of various elements shown in FIGS. 1-10. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1220 to fabricate integrated circuit 1230.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A computing system, comprising:
   a plurality of compute die packages that include processors configured to execute program instructions that operate on data stored in a distributed memory accessible via a unified memory architecture; and
   a plurality of memory die packages configured to implement the unified memory architecture, wherein a given one of the memory die packages includes:
      one or more optical dies including one or more optical interfaces configured to receive memory requests from the processors; and
      a memory controller die coupled to the one or more optical dies via one or more die-to-die interconnects, wherein the memory controller die includes a cache and one or more memory controllers configured to access a portion of the distributed memory in response to the received memory requests; and
   wherein the plurality of compute die packages are distinct from the plurality of memory die packages.

2. The computing system of claim 1, wherein the cache is configured to store a subset of the data stored in the portion of the distributed memory, wherein the given memory die package is configured to service one or more of memory requests from the cache.

3. The computing system of claim 1, wherein the given memory die package includes:
   one or more memories coupled to the one or more memory controllers and corresponding to the portion of distributed memory.

4. The computing system of claim 1, wherein the given memory die package is configured to perform address hashing to distribute data across multiple memories coupled to the one or more memory controllers.

5. The computing system of claim 1, further comprising:
   a memory tray including multiple ones of the memory die packages.

6. The computing system of claim 5, further comprising:
   a memory rack, wherein the memory tray is one of a plurality of memory trays inserted into the memory rack.

7. The computing system of claim 1, wherein the processors include one or more central processing units (CPUs).

8. The computing system of claim 7, wherein the processors further include one or more graphics processing units (GPUs), application-specific integrated circuit (ASICs), or field-programmable gate arrays (FPGAs).

9. The computing system of claim 1, wherein a given one of the plurality of compute die packages includes:
   a compute die includes one or more processors and a die-to-die interconnect; and

an optical die coupled to the compute die via the die-to-
die interconnect and including one or more optical
interfaces.

10. The computing system of claim 9, further comprising:
a compute tray including the plurality of compute die
packages.

11. The computing system of claim 10, further compris-
ing:
a compute rack, wherein the compute tray is one of a
plurality of compute trays inserted into the compute
rack.

12. The computing system of claim 11, further compris-
ing:
a plurality of interconnected compute nodes, wherein a
given one of the compute nodes includes one or more
compute racks coupled to one or more memory racks.

13. The computing system of claim 1, wherein the pro-
cessors are configured to access any address within a unified
address space defined by the unified memory architecture.

14. The computing system of claim 1, wherein a given
page within a unified address space defined by the unified
memory architecture is distributed among multiple ones of
memory die packages.

15. The computing system of claim 1, wherein the com-
pute die packages and the memory die packages are coupled
together via an optical interconnect fabric that includes at
least two networks having heterogeneous operational char-
acteristics.

18

16. An integrated circuit, comprising:
a memory die package having one or more co-packaged
dies, wherein the memory die package includes:
one or more optical dies including an optical interface
configured to receive, via an optical fiber, memory
requests from one or more processors in one or more
compute die packages separate from the memory die
package;
a memory controller die coupled to the one or more
optical dies via one or more die-to-die interconnects,
wherein the memory controller die includes:
a memory controller coupled to a memory and
configured to service the memory requests; and
a cache of the memory configured to store a portion
of data stored in the memory.

17. The integrated circuit of claim 16, wherein the
memory die package is configured to implement a unified
memory architecture of a distributed memory accessible to
the one or more processors.

18. The integrated circuit of claim 17, wherein the
memory die package is configured to store a given page
within a unified address space defined by the unified
memory architecture such that the given page is distributed
among the memory die package and one or more additional
memory die packages.

* * * * *